Figure 1:
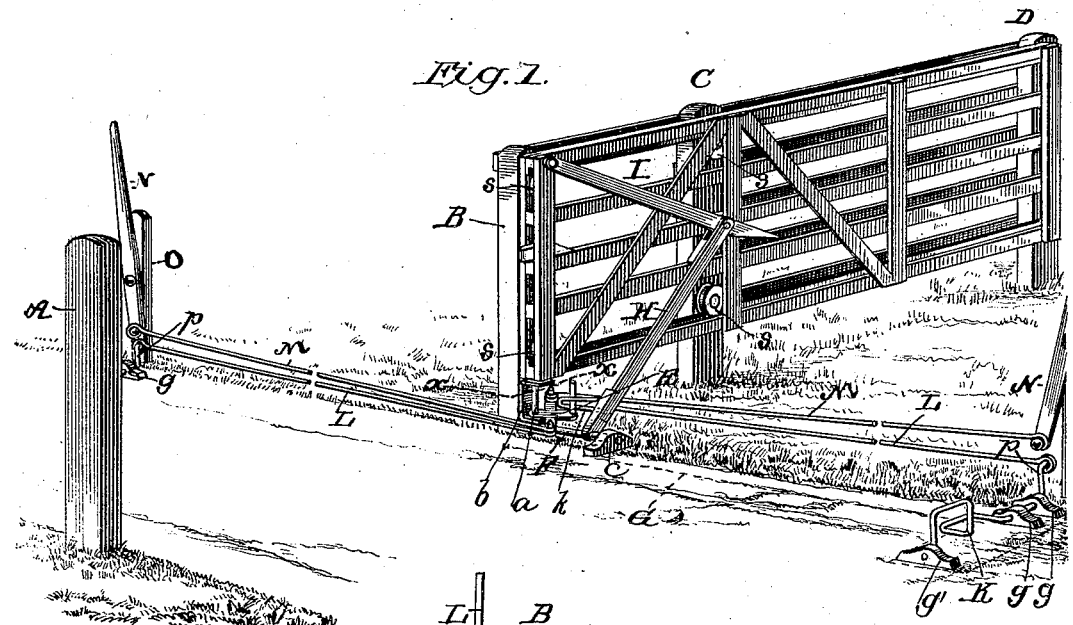

(No Model.)

J. T. CRIM.
AUTOMATIC SLIDING OR ROLLING GATE.

No. 492,863. Patented Mar. 7, 1893.

WITNESSES:
W. C. Keigin
W. R. Birry

INVENTOR
John T. Crim
BY
Holcomb & Johnston
ATTORNEYS.

UNITED STATES PATENT OFFICE.

JOHN T. CRIM, OF EUREKA SPRINGS, ARKANSAS.

AUTOMATIC SLIDING OR ROLLING GATE.

SPECIFICATION forming part of Letters Patent No. 492,863, dated March 7, 1893.

Application filed January 9, 1893. Serial No. 457,802. (No model.)

*To all whom it may concern:*

Be it known that I, JOHN T. CRIM, a citizen of the United States, residing at Eureka Springs, in the county of Carroll and State of Arkansas, have invented certain new and useful Improvements in Automatic Sliding or Rolling Gates; and I do hereby declare the following to be a full, clear, and exact description of the invention, such as will enable others skilled in the art to which it appertains to make and use the same.

My invention relates to the class of automatically operated gates, which are adapted to be opened or closed by a passing vehicle, or by means of a lever actuated by a passenger on foot or on horseback, and more especially to the class of sliding or rolling gates.

It consists in certain details of construction and arrangement of parts more particularly described in the accompanying specification, illustrated in the drawings, and pointed out in the claims.

Its object is to provide an automatically operating gate which is simple and cheap in construction, effective in operation, durable and not liable easily to get out of order, easily repaired, and of which the operative parts may be made by any ordinary blacksmith.

In the accompanying drawings, similar letters indicate like parts.

Figure 2:
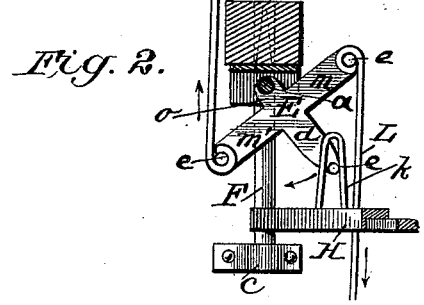
Figure 3:
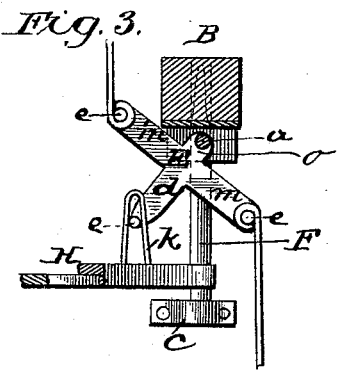

Figure 1, is a perspective view showing the gate open. Fig. 2, is a horizontal section through the dotted line $x-x$ of the main or inner gate post to which part of the operating mechanism is hinged or pivoted, showing the position of the oscillating crank lever when the gate is open. Fig. 3, is a similar view showing the position of the same when the gate is closed.

Referring more particularly to the drawings by letter, A is the outer gate post, to which the gate is latched when closed.

B is the inner or main gate post to which the operating mechanism is attached.

C is a supporting post, upon which the gate is suspended and supported by friction rollers when open.

D represents an ordinary fence post at the outer end of the fence panel adjacent to the gate.

E is an oscillating crank lever which is pivoted in a horizontal position by its short arm to the main gate post B, near its foot by means of a vertical pivot rod $a$ secured within the horizontally projecting ends of a U shaped plate $b$, which is bolted or secured to the post. This crank lever is preferably composed of two strips of bar iron, one of which is slightly longer than the other; the shorter being placed across the center or middle of the longer at right angles, so that one end projects a short distance, and its opposite end a considerable distance beyond the sides of the longer. Both are firmly welded together, forming a single piece; or the whole may be stamped or struck from a single piece of metal. This crank lever, so constructed, is composed of two lateral long arms $m\ m'$, a central long arm $d$ and a central short arm $o$, the central arms being at right angles with the others. On the ends of the long arms are vertically projecting pins $e$, and the end of the short arm $o$ is perforated to receive the rod $a$ which passes through it and forms the crank-lever pivot.

F is a short horizonal rod or bar, one end of which enters the main post B beneath the plate $b$, a short distance above the ground, and its opposite end is supported in a block $c$ secured to a sill which is embedded in the ground to a point flush with its surface, at right angles with the gate.

H is a lever, through the lower end of which the horizontal rod or bar F passes, forming a pivot. This lever is provided near its lower or pivoted end with a stirrup or loop $k$, projecting at right angles over the central long arm $d$ of the crank lever E, and engaging therewith by means of the vertically arranged pin $e$ on the lever arm which projects into said loop or stirrup. The opposite end of this lever H is connected by a pivot joint with one end of a bar or pitman I the opposite end of which is pivotally connected with the upper outer corner of the gate as shown in Fig. 1.

K is a horizontally arranged rod or shaft, which for convenience will be termed the rock-shaft, and which is located at a suitable distance from the gate on one side of the road or driveway upon the ground. This shaft is journaled near one end in blocks or guides $g\ g$, and its opposite end, in a similar block $g'$. Between these journal blocks, two U shaped bends are formed in the shaft at right angles with each other, so that when one lies flat upon the ground, the other occupies a vertical position, as shown in Fig. 1. Upon the outer end of this shaft is formed a crank $p$.

L is a rod connecting the crank $p$ with one arm $m$ of the crank lever E, as shown in Figs. 2 and 3. M is a similar connecting rod connecting arm $m$ of the crank lever with the foot of a lever N which is pivoted to a post O, located adjacent to the crank $p$ of the rock shaft. A similar rock shaft and connecting rods are provided on the opposite side of the gate which correspond in all respects with those already described, except that they connect with the opposite arm $m'$ of the crank lever. The gate is suspended upon the supporting posts B. C. by the grooved or flanged friction rollers $s$, secured to said posts beneath the upper rail and above the lower rail, thereby enabling it to slide or roll easily backward and forward.

Having thus described the various parts of my gate in detail, I will proceed to describe its operation. The rock-shaft K (which does not differ materially from other rock shafts designed for operating automatic gates) by reason of the right angled position of its U shaped bends with relation to each other, always presents one of these bends in a vertical position. Assuming the gate to be closed and a vehicle approaching, the wheel of the passing vehicle is guided to strike this projecting part and cause it to turn downward in the direction of the gate; this causes the shaft to revolve partially and turns the crank $p$, which, through the medium of the connecting rod L oscillates the crank lever E toward the right, and the pin $e$ on its arm $d$ engaging with the stirrup loop $k$ forces the lever H backward which in turn by means of its pivotal connection with the pitman bar I rolls the gate back over the friction rollers $s$ to the position shown in Fig. 1, when the vehicle passes through. The crank lever E has then assumed the position shown in Fig. 2. When the vehicle reaches the rock shaft on the opposite side of the gate, the same operation is repeated, but, as that rock shaft is connected with the opposite arm $m'$ of the crank lever, the gate is caused to move in a reverse direction and close, and the crank lever assumes the position shown in Fig. 3. In the case of a passenger on foot, or on horseback, the crank lever is actuated by means of the pivoted lever N, and connecting rod M, and the rock shaft is not employed to move the gate.

It will be observed that all the iron work employed in the construction of my gate is simple in character and can be easily fashioned by an ordinary blacksmith with the tools and materials usually found in an ordinary blacksmith shop; thus dispensing with the use of the cog wheels or gearing usually employed in the construction of gates of this class, which is expensive and sometimes difficult to obtain.

Having thus described my invention, what I claim, and desire to secure by Letters Patent, is—

1. In an automatic sliding gate the crank lever E in combination with the rock shaft and its connecting rod and the oscillating lever H pivotally connected with the gate substantially as described.

2. In an automatic sliding gate, the horizontally oscillating crank lever pivoted to the foot of the gate post, in combination with the pivoted oscillating lever H, provided with the stirrup loop engaging the crank lever, and pivotally connected with the gate, and the rock-shaft, or its equivalent, and connecting rod arranged substantially as and for the purpose set forth.

3. In an automatic sliding gate, the horizontally oscillating crank lever provided with one short and three long arms and pivoted by its short arm to the gate post, in combination with the lever H having the stirrup loop engaging one arm of the crank shaft, and pivoted to the horizontal rod F at one end, its opposite end being pivotally connected with the gate, substantially as described.

4. In an automatic sliding gate, the combination with the horizontally pivoted crank lever provided with one short and three long arms, the latter having vertically projecting pins on their ends, of the pivoted lever H, having the stirrup loop adapted to engage with the pin on one of the arms of the crank lever, the pitman bar I, the rock shaft and its connecting rod engaging the crank lever, all constructed substantially as and for the purpose set forth.

5. In an automatic sliding gate, the combination with the horizontally oscillating crank lever pivoted to the gate post and the pivoted lever H having the stirrup loop $k$, and pivotally connected with the gate, of the rock shaft, the rod L connecting the rock shaft with the crank lever, the pivoted lever N and the rod M connecting it with the crank lever, substantially as and for the purpose described.

In testimony whereof I affix my signature in presence of two witnesses.

JOHN T. CRIM.

Witnesses:
DAVIS HILL,
KENESS F. RICE.